United States Patent [19]

Lehner et al.

[11] Patent Number: 4,647,513

[45] Date of Patent: Mar. 3, 1987

[54] MAGNETIC RECORDING MEDIA

[75] Inventors: August Lehner, Roedersheim-Gronau; Albert Kohl, Dirmstein; Werner Balz, Limburgerhof; Friedrich Sommermann, Kehl; Milan Velic, Ludwigshafen; Werner Grau, Bobenheim-Roxheim; Reinhold Baur, Ortenberg, all of Fed. Rep. of Germany

[73] Assignee: BASF Aktiengesellschaft, Fed. Rep. of Germany

[21] Appl. No.: 685,253

[22] Filed: Dec. 24, 1984

[30] Foreign Application Priority Data

Dec. 30, 1983 [DE] Fed. Rep. of Germany ....... 3347532

[51] Int. Cl.$^4$ ............................................... G11B 5/70
[52] U.S. Cl. .................................... 428/694; 428/328; 428/900
[58] Field of Search ............... 428/694, 695, 328, 900; 427/128; 252/62.53, 62.56

[56] References Cited

U.S. PATENT DOCUMENTS

| 4,066,820 | 1/1978 | Kelly et al. | 428/483 |
| 4,091,143 | 5/1978 | Hartmann et al. | 428/328 |
| 4,305,995 | 12/1981 | Ota et al. | 428/694 X |
| 4,310,565 | 1/1982 | Lehner et al. | 427/48 |
| 4,322,474 | 3/1982 | Matsuura et al. | 428/411 |
| 4,328,282 | 5/1982 | Lehner et al. | 428/425.9 |
| 4,442,171 | 4/1984 | Sato et al. | 428/694 X |
| 4,448,842 | 5/1984 | Yamaguchi et al. | 428/694 X |
| 4,452,863 | 6/1984 | Takizawa et al. | 428/694 X |
| 4,456,661 | 6/1984 | Yamamoto | 428/694 X |

FOREIGN PATENT DOCUMENTS

| 1794429 | 11/1979 | Fed. Rep. of Germany | 27/00 |
| 3227163 | 1/1984 | Fed. Rep. of Germany | . |
| 2032428 | 5/1980 | United Kingdom | 53/126 |
| 2039281 | 8/1980 | United Kingdom | 5/68 |

Primary Examiner—Nancy Swisher
Attorney, Agent, or Firm—Keil & Weinkauf

[57] ABSTRACT

Magnetic recording media consisting of a non-magnetic base and, applied thereto, one or more firmly adhering magnetizable layers based on magnetic material finely dispersed in a polymeric binder, at least one lubricant and further conventional additives, wherein the lubricant used is zinc stearate which has been rendered hydrophilic.

10 Claims, No Drawings

MAGNETIC RECORDING MEDIA

The present invention relates to magnetic recording media which consist of a non-magnetic base and, applied thereto, one or more firmly adhering magnetizable layers which are based on magnetic material finely dispersed in a polymeric binder, at least one lubricant and other conventional additives.

During the recording and playback of signals by means of magnetic recording media which are passed over the magnetic head in contact therewith and are furthermore transporter over tape guide rollers or pins or other tape guide elements, very high frictional forces, and frequently also stick-slip motion, may occur, depending on the composition of the layer. Moreover, the wear which occurs when such recording media are in use presents a problem with regard to not only there durability but also their operational reliability. It is therefore usual to add lubricants to the magnetic dispersions used in the production of magnetic recording media. Suitable lubricants which have been described for this purpose include a large number of different lubricants, such as polydimethylsiloxanes, paraffin oils, waxes, saturated and unsaturated fatty acids, fatty acid esters, fatty acid amides and salts of fatty acids, as well as solid lubricants, such as molybdenum sulfide, graphite, polytetraethylene powder and polytrichlorofluoroethylene powder. It has also been stated that, in comparison with the solid lubricants, liquid or pasty lubricants have the advantage that they cover the lubricated surfaces with a thin uniform film; the amount of lubricant added must be kept very small, since otherwise the surface readily becomes tacky. Frequently, however, these liquid lubricants cannot be used as the sole lubricant and are therefore combined with solid or pasty lubricants. When liquid lubricants are used exclusively, sticking or blocking of the tapes cannot be permanently prevented in many fields of use, particularly in the case of sustained operation and unfavorable temperature and humidity conditions. When lubricants in the form of finely divided insoluble hydrophobic solids or waxy substances are added, lubrication is not uniform; instead, only a short time after production of the tape, the solid particles are located only in certain areas on the surface and in the interior of the magnetic layer. When such lubricants are used in aqueous binder systems, it is particularly difficult to disperse them uniformly therein. Particularly in an aqueous medium, but also in solvents, these hydrophobic lubricants can be applied only with difficulty, if at all, to the magnetic material, which is generally hydrophilic, and are readily exuded, particularly under unfavorable climatic conditions, such as high temperatures and high atmospheric humidity. This results in deposits on all components which come into contact with the tape, particularly on the recording/playback head, causing drops in output level.

It is an object of the present invention to provide magnetic recording media which consist of a non-magnetic base and, applied thereto, at least one firmly adhering magnetizable layer based on magnetic material finely dispersed in a polymeric binder, at least one lubricant and conventional additives, and which are more hardwearing and exhibit less friction even under unfavorable temperature and humidity conditions, and furthermore do not exhibit the disadvantageous effect of blocking during operation of the recording media, or exudation of lubricants.

We have found that this object is achieved in a simple manner if the magnetizable layer of the magnetic recording medium contains, as lubricant, from 0.1 to 4% by weight, based on the magnetic material, of zinc stearate which has been rendered hydrophilic.

In the case of the novel magnetic recording media, the addition of zinc stearate which has been rendered hydrophilic, as lubricant, is advantageous both for aqueous and for solvent-containing binder systems. In the case of solvent-containing systems, thorough wetting of the magnetic material is advantageously achieved if the latter contains from 0.3 to 2% by weight of bound water.

For special applications for the magnetic recording media, it has proven advantageous to combine the zinc stearate which has been rendered hydrophilic with other lubricants in order to optimize the recording media.

The zinc stearate which has been rendered hydrophilic and is used as lubricant in the novel magnetic recording media contains from 3 to 30, in particular from 4 to 12, % of a hydrophilic component. The agent which imparts hydrophilicity possesses an alkyl chain and a hydrophilic group. Substances which are suitable for this purpose are:

1. alkyl benzenesulfonates having a $C_6$–$C_{25}$ alkyl chain, in particular a $C_{14}$–$C_{20}$-alkyl chain,
2. adducts of ethylene oxide with a $C_{12}$–$C_{25}$, preferably $C_{14}$–$C_{20}$, fatty alcohol, the adducts contaning from 2 to 20 ethylene oxide groups,
3. amino or aminoalcoholalkylsulfonates possessing a $C_{15}$–$C_{25}$-alkyl chain,
4. alkylbetains having a $C_{14}$–$C_{20}$-alkyl chain, and
5. mono-, di- or triesters of phosphoric acid with $C_{12}$–$C_{25}$-monoalcohols.

Preferred products are those which contain a $C_{18}$-alkyl chain, an alkyl benzenesulfonate having a $C_{18}$-alkyl chain being particularly suitable.

The amount of zinc stearate which has been rendered hydrophilic and which is incorporated into the novel magnetic recording media is from 0.1 to 4, preferably from 0.3 to 2.5, % by weight, based on the magnetic material. In the present invention, it has proven advantageous for the zinc stearate which has been rendered hydrophilic to contain not more than 5% by weight of an electrolyte, eg. NaCl or $Na_2SO_4$.

The novel magnetic recording media are produced in a conventional manner. The binders used for dispersing the magnetic material are the conventional organic polymers usually employed for this purpose. They are described in, inter alia, German Laid-Open-Applications DOS No. 2,513,422, DOS No. 3,227,161, DOS No. 3,227,163 and DOS No. 3,227,164, German Published Application DAS No. 2,175,685, German Pat. Nos. 2,442,762 and 2,753,694, and U.S. Pat. Nos. 4,310,565 and 4,328,282.

Preferably used solvents are water, cyclic ethers, such as tetrahydrofuran and dioxane, and cyclic ketones, such as cyclohexanone. Where polyurethanes are used as binders, it is also possible, depending on the field of use, to employ other highly polar solvents, such as dimethylformamide, N-methylpyrrolidone, dimethyl sulfoxide or ethylglycol acetate. The said solvents can also be mixed with aromatics, such as toluene or xylene, and esters, such as ethyl acetate or butyl acetate.

Preferably used magnetic materials are finely divided acicular gamma-iron(III) oxide having a mean particle size of from 0.1 to 2 μm, in particular from 0.1 to 0.9

μm, and acicular chromium dioxide having the same particle size as the iron oxide. Other suitable materials are gamma-iron(III) oxide doped with heavy metals, in particular with cobalt, and finely divided metal alloys of iron, cobalt and/or nickel.

Further additives can be added to the dispersions to improve the magnetic layer. Examples of such additives are fatty acids, polycarboxylic acids, mono-, di- or polysulfonic acids and phosphoric acids and mixtures of these, and esters, waxes, lecithins, silicone oils and fluorocarbons, as well as fillers, such as carbon black, graphite, powdered quartz and/or non-magnetizable powder based on silicates. In general, the total amount of such additives is less than 10% by weight, based on the magnetic layer.

Depending on the binder system and spectrum of tape properties, crosslinking of the magnetic recording media may be necessary, this being achieved by reaction of the polyurethanes or polyurethane binder mixtures with polyisocyanates. A large number of organic di-, tri- or polyisocyanates or isocyanate prepolymers having a molecular weight of up to 10,000, preferably from 500 to 3,000, can be used for crosslinking. Polyisocyanates which have more than 2 NCO groups per molecule are preferred, and polyisocyanates which are based on toluylene diisocyanate, hexamethylene diisocyanate or isophorone diisocyanate and are obtained by polyaddition with diols and triols or by biuret and isocyanurate formation have proven particularly suitable. An adduct of toluylene diisocyanate with trimethylolpropane and diethylene glycol is particularly advantageous. The amount of polyisocyanate can vary very greatly, depending on the binder system.

Because water reacts with the isocyanate, the presence of even small amounts of water during the conventional crosslinking of binder systems with polyisocyanates is disadvantageous; however, in the case of the novel recording media, it is advantageous with regard to wetting of the pigment if the magnetic material contains from 0.3 to 2% by weight of water. Contrary to the expected reaction, the presence of the zinc stearate which has been rendered hydrophilic, and of traces of water contained in the magnetic material, results in a more uniform crosslinking reaction compared with that in the case of conventional coating mixes.

The novel magnetic recording media are produced in a conventional manner. For this purpose, the magnetic material together with the binder used, the lubricant of the present invention, further additives and sufficient solvent are dispersed in a dispersing apparatus, for example a tubular ball mill or a stirred ball mill. It is, however, also possible to subsequently add the novel lubricant to the finished coating mix before it is applied to the base material. To obtain the desired binder/pigment ratio, the binder can be added to the mixture either in the solid state or in the form of from 10 to 60% strength solutions or from 20 to 60% strength dispersions. It has proven advantageous to continue dispersing until the magnetic material has been extremely finely dispersed, which can take from 1 to 7 days. Subsequent repeated filtration gives a completely homogeneous magnetic dispersion. Any crosslinking agents required are added to the dispersion before the coating operation.

The magnetic dispersion is then applied to the non-magnetizable base with the aid of a conventional coating apparatus, for example a knife coater. The non-magnetic and non-magnetizable bases used are the conventional ones, in particular films of linear polyesters, such as polyethylene terephthalate, generally from 4 to 200, in particular from 6 to 36, μm thick. Before the still fluid coating mix is dried on the base, an operation which is advantageously carried out at from 50° to 90° C., the anisotropic magnetic particles are oriented in the intended recording direction, if necessary by the action of a magnetic field. The magnetic layers can then be calendered on conventional apparatuses by passing the coated base between polished rollers optionally heated to from 40° to 100° C., preferably from 60° to 80° C. The magnetic layer is in general from 3 to 20, preferably from 4 to 15, μm thick.

Compared with prior art magnetic recording media, the novel magnetic recording media are more hardwearing and exhibit improved stability in tropical climates. Friction is reduced, drops in output level are avoided, and blocking of the tapes is prevented.

The Examples which follow illustrate the invention and demonstrate its advantages over the prior art (comparative experiments). In the Examples, parts and percentages are by weight, unless stated otherwise.

To assess the physical properties of the magnetic recording media, the following tests were employed:

TEST 1

Coefficient of friction, magnetic layer/steel, before and after sustained operation The coefficients of friction were determined, in accordance with DIN 45,522, Sheet1, on the virgin tape and on the tape after it had been in use for a prolonged period.

TEST 2

Friction at very low relative velocity

The coefficient of friction was determined by measuring the tensile force produced by the friction between a moving magnetic tape and a stationary drum. The latter was a steel drum having a surface roughness of about 0.15 μm and a diameter of 70 mm. The piece of tape was 25 cm long and was drawn, under a tension of 20 cN, over the drum at a velocity of 1 mm/sec, the wrap-around angle being 180°. The tensile force exerted on the drum, F, is a measure of the coefficient of friction $\mu$, where $\mu = 1/\pi \times \ln F/20$. (Test conditions: 23° C., 50% relative humidity).

TEST 3

Dynamic friction

The coefficient of friction was determined as described in Test 2, except that the magnetic tape was passed over the steel drum rotating at a peripheral speed of 9.5 cm/sec.

TEST 4

Deposits 4 cassettes loaded with the magnetic tape were played back on a recorder for 20 hours at 30° C. and 93% relative humidity. The deposits on the erasing head, on the recording/playback head and on the capstan were then assessed visually. The thickness of the deposits was assessed according to a rating system of 1 to 6 (1 denoting no deposits, and 6 very thick deposits), and the average was taken.

TEST 5

Drop in output level

The number of runs until a drop in the output level of more than 2 db occurred was determined.

TEST 6

Exudation

Pieces of magnetic tape 10 cm in length were laid flat on a sheet of glass and stored in a cabinet dryer at 50° C. for 7 days. The surface of the magnetic layer was then examined to see if any exudation had taken place.

TEST 7

Deposits under tropical climatic conditions 10 cassettes loaded with the magnetic tape were stored for 4 weeks at 40° C. and 93% relative humidity and then played back at 30° C. and 93% relative humidity. Assessment of the deposits was carried out as in Test 4.

TEST 8

Suitability for duplication

Groups of 10 cassettes were stored under the same temperature and humidity conditions as in Test 7. Each cassette was then subjected to one pass at 8 times the normal speed (38 cm/sec). The percentage of the cassettes which exhibited disturbances in the running of the tape and blocking is given.

EXAMPLE 1

1,200 parts of a magnetic iron oxide having a coercive force of 26 kA/m and a specific surface area of 20 m$^3$/g, 96 parts of a 25% strength solution of a copolymer based on methylpolyglycol acrylate/methacrylic acid, 12 parts of a commercial silicone oil and 12 parts of zinc stearate which had been rendered hydrophilic (zinc stearate with 6% of stearyl benzenesulfonate and 4% of sodium sulfate), and 840 parts of water, were dispersed for 24 hours in a steel ball mill having a capacity of 6,000 parts by volume and charged with 8,000 g of balls. 750 parts of a 40% strength polyurethane ionomer dispersion as described in Example 1 of German Laid-Open Application DOS No. 2,513,422 were then incorporated into this mixture.

This magnetic dispersion was filtered and then applied to a 12 μm thick polyethylene terephthalate film, using a knife coater. The coated film was passed through a homogeneous magnetic field in order to orient the magnetic particles in the layer and was then dried at from 70° to 90° C., after which the applied layer was smoothened and compressed by calendering at 70° C. The magnetic layer was 4.7 μm thick. The coated film was then slit into 3.81 mm wide tapes which were loaded into commercial cassettes. The test results are shown in Table 1.

EXAMPLE 2

The procedure described in Example 1 was followed, except that, instead of the copolymer stated there, an aqueous polyurethane ionomer dispersion as described in Example 1 of U.S. Pat. No. 4,310,565 was employed as the binder. The test results are shown in Table 1.

COMPARATIVE EXPERIMENT 1

The procedure described in Example 1 was followed, except that pure zinc stearate was employed instead of the zinc stearate which had been rendered hydrophilic. The test results are shown in Table 1.

COMPARATIVE EXPERIMENT 2

The procedure described in Example 2 was followed, except that pure zinc stearate was employed instead of the zinc stearate which had been rendered hydrophilic. The test results are shown in Table 1.

TABLE 1

| | Example 1 | Example 2 | Comparative Experiment 1 | Comparative Experiment 2 |
|---|---|---|---|---|
| Test 1 before sustained operation | 0.30 | 0.31 | 0.56 | 0.51 |
| Test 1 after sustained operation | 0.30 | 0.33 | 0.57 | 0.55 |
| Test 2 | 0.17 | 0.20 | 0.32 | 0.30 |
| Test 3 | 0.26 | 0.27 | 0.54 | 0.52 |
| Test 4 | 1.3 | 1.3 | 3.4 | 3.7 |
| Test 5 | 100 | 100 | 16 | 21 |
| Test 6 | no | no | yes | yes |

EXAMPLE 3

600 parts of steel balls having a diameter of from 4 to 6 mm, 102 parts of tetrahydrofuran, 31 parts of a 50% strength solution of the polyurethaneureas described in Example D of German Laid-Open Application DOS No. 3,227,164, 100 parts of a ferromagnetic chromium dioxide having a mean needle length of 0.5 μm, 2.0 parts of zinc stearate which had been rendered hydrophilic (as described in Example 1), 0.25 part of a commercial silicone oil, 0.5 part of methyl stearate, 0.5 part of isostearic acid and 5 parts of zinc oxide were introduced into a steel ball mill having a capacity of 600 parts by volume, and dispersing was carried out for 36 hours. The dispersion was then filtered under pressure, 0.028 part of a 75% strength solution of a triisocyanate obtained from 3 moles of toluylene diisocyanate and 1 mole of trimethylolpropane, per part of dispersion, was added to the stirred dispersion, and immediately thereafter the dispersion was applied to a 15 μm thick polyethylene terephthalate film. The coated film was passed through a magnetic field in order to orient the magnetic particles, dried at from 50° to 80° C., calendered by passing it between heated rollers (60° C., nip pressure 200 kg/cm) and slit into 3.81 mm wide tapes.

The magnetic properties were measured in a magnetic field of 160 kA/m. The residual induction was 178 mT and the orientation ratio, ie. the ratio of the residual induction in the playing direction to that in the crosswise direction, was 3.0. The results obtained in the tests are given in Table 2.

COMPARATIVE EXPERIMENT 3

The procedure described in Example 3 was followed, except that pure zinc stearate was employed instead of the zinc stearate which had been rendered hydrophilic. The test results are shown in Table 2.

COMPARATIVE EXPERIMENT 4

The procedure described in Example 3 was followed, except that pure zinc oleate was employed instead of the zinc stearate which had been rendered hydrophilic. The test results are shown in Table 2.

TABLE 2

|  | Example 3 | Comparative Experiment 3 | Comparative Experiment 4 |
| --- | --- | --- | --- |
| Test 7 | 1.4 | 1.7 | * |
| Test 8 | 0 | 0 | 100 |
| Test 4 | 1.4 | 3.0 | 1.4 |
| Test 5 | 100 | 30 | 100 |
| Test 6 | no | yes | no |

*Assessment of deposits was not possible because tape blocked.

We claim:

1. A magnetic recording medium which consists of a non-magnetic base and, applied thereto, at least one firmly adhering magnetizable layer based on magnetic material finely dispersed in a polymeric binder, at least one lubricant and conventional additives, wherein the said layer contains, as lubricant, from 0.1 to 4% by weight, based on the magnetic material, of zinc stearate which, prior to incorporation into the binder has been rendered hydrophilic by chemically modifying the zinc stearate with an agent containing both an alkyl chain and a hydrophilic group.

2. A magnetic recording medium as defined in claim 1, wherein the magnetizable layer contains, as lubricant, from 0.1 to 4% by weight, based on the magnetic material, of zinc stearate which has been rendered hydrophilic and which contains not more than 5% by weight of an electrolyte.

3. A magnetic recording medium as defined in claim 1, wherein the zinc stearate contains from 3 to 30% of a hydrophilic component.

4. A magnetic recording medium as defined in claim 3, wherein the hydrophilic component is an alkyl benzenesulfonate having a $C_{14}$–$C_{20}$ alkyl chain.

5. A magnetic recording medium as defined in claim 3, wherein the hydrophilic component is an alkyl benzenesulfonate having a $C_{18}$ alkyl chain.

6. A magnetic recording medium as defined in claim 1, wherein the modifying agent is an alkyl benzenesulfonate having a $C_6$–$C_{25}$ alkyl chain.

7. A magnetic recording medium as defined in claim 1, wherein the modifying agent is an adduct of ethylene oxide with a $C_{12}$–$C_{25}$ fatty alcohol, said adduct containing from 2 to 20 ethylene oxide groups.

8. A magnetic recording medium as defined in claim 1, wherein the modifying agent is an amino or aminoalcohol alkylsulfonate containing a $C_{15}$–$C_{25}$ alkyl chain.

9. A magnetic recording medium as defined in claim 1, wherein the modifying agent is an alkylbetain containing a $C_{14}$–$C_{20}$ alkyl chain.

10. A magnetic recording medium as defined in claim 1, wherein the modifying agent is a mono-, di- or triester of phosphoric acid with $C_{12}$–$C_{25}$ mono-alcohols.

* * * * *